(12) United States Patent
Park et al.

(10) Patent No.: US 7,362,407 B2
(45) Date of Patent: Apr. 22, 2008

(54) METHOD OF FABRICATING LIQUID CRYSTAL DISPLAY DEVICE

(75) Inventors: Moo Yeol Park, Taegu-kwangyokshi (KR); Sung Su Jung, Taegu-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/244,734

(22) Filed: Sep. 17, 2002

(65) Prior Publication Data

US 2003/0147040 A1 Aug. 7, 2003

(30) Foreign Application Priority Data

| Feb. 1, 2002 | (KR) | P2002-005828 |
| Feb. 5, 2002 | (KR) | P2002-006488 |

(51) Int. Cl.
*G02F 1/13* (2006.01)

(52) U.S. Cl. ............... 349/187; 349/189; 349/190
(58) Field of Classification Search .......... 349/187, 349/189, 190, 153
See application file for complete search history.

(56) References Cited

U.S. PATENT DOCUMENTS

| 3,978,580 | A | | 9/1976 | Leupp et al. |
| 4,094,058 | A | | 6/1978 | Yasutake et al. ......... 29/592 R |
| 4,494,825 | A | | 1/1985 | Sasaki et al. |
| 4,653,864 | A | | 3/1987 | Baron et al. |
| 4,691,995 | A | | 9/1987 | Yamazaki et al. ....... 350/331 R |
| 4,775,225 | A | | 10/1988 | Tsuboyama et al. |
| 5,106,441 | A | * | 4/1992 | Brosig et al. ............... 156/104 |
| 5,247,377 | A | | 9/1993 | Omeis et al. ................. 359/76 |
| 5,263,888 | A | | 11/1993 | Ishihara et al. |
| 5,379,139 | A | | 1/1995 | Sato et al. |
| 5,406,989 | A | | 4/1995 | Abe |
| 5,499,128 | A | | 3/1996 | Hasegawa et al. |
| 5,507,323 | A | | 4/1996 | Abe |
| 5,511,591 | A | | 4/1996 | Abe ............................ 141/7 |
| 5,539,545 | A | | 7/1996 | Shimizu et al. |
| 5,548,429 | A | | 8/1996 | Tsujita |

(Continued)

FOREIGN PATENT DOCUMENTS

| CN | 1234524 A | 11/1999 |
| EP | 1 003 066 A1 | 5/2000 |
| JP | 51-065656 | 6/1976 |
| JP | 52-149725 | 12/1977 |
| JP | 57-38414 | 3/1982 |
| JP | 57-88428 | 6/1982 |
| JP | 57-144527 | 9/1982 |
| JP | 58-27126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-89025 | 4/1987 |

(Continued)

*Primary Examiner*—David Nelms
*Assistant Examiner*—David Y. Chung
(74) *Attorney, Agent, or Firm*—McKenna Long & Aldridge LLP

(57) ABSTRACT

Disclosed is a method of fabricating a liquid crystal display device including forming a UV-hardening sealant on at least one of the first and second substrates, dropping a liquid crystal on one of the first and second substrates, attaching the first and second substrates to each other, aligning at least one mask with the attached substrates so as to expose only an area having the sealant formed thereon, and hardening the UV-hardening sealant by applying UV-rays through the mask to the attached substrates.

24 Claims, 11 Drawing Sheets

U.S. PATENT DOCUMENTS

| | | | |
|---|---|---|---|
| 5,595,620 A | 1/1997 | Takei | |
| 5,642,214 A | 6/1997 | Ishii et al. | 349/96 |
| 5,680,189 A | 10/1997 | Shimizu et al. | |
| 5,742,370 A | 4/1998 | Kim et al. | 349/124 |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | 222/1 |
| 5,898,041 A | 7/1999 | Yamada et al. | |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A * | 1/2000 | Kato et al. | 349/190 |
| 6,016,178 A | 1/2000 | Kataoka et al. | 349/117 |
| 6,016,181 A | 1/2000 | Shimada | |
| 6,055,035 A | 4/2000 | von Gutfeld et al. | 349/187 |
| 6,163,357 A | 12/2000 | Nakamura | 349/155 |
| 6,219,126 B1 | 4/2001 | Von Gutfeld | |
| 6,222,603 B1 * | 4/2001 | Sakai et al. | 349/153 |
| 6,226,067 B1 | 5/2001 | Nishiguchi et al. | 349/155 |
| 6,236,445 B1 | 5/2001 | Foschaar et al. | |
| 6,304,306 B1 | 10/2001 | Shiomi et al. | 349/88 |
| 6,304,311 B1 | 10/2001 | Egami et al. | 349/189 |
| 6,337,730 B1 | 1/2002 | Ozaki et al. | |
| 6,414,733 B1 | 7/2002 | Ishikawa et al. | 349/110 |
| 6,636,290 B1 * | 10/2003 | Glownia et al. | 349/187 |
| 6,646,689 B2 * | 11/2003 | Matsuda | 349/1 |
| 2001/0021000 A1 | 9/2001 | Egami | 349/187 |

FOREIGN PATENT DOCUMENTS

| | | |
|---|---|---|
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 5-127179 | 5/1993 |
| JP | 5-154923 A | 6/1993 |
| JP | 8234213 | 9/1993 |
| JP | 5-265011 | 10/1993 |
| JP | 5-281557 | 10/1993 |
| JP | 5-281562 | 10/1993 |
| JP | 6-51256 | 2/1994 |
| JP | 6-148657 | 5/1994 |
| JP | 6-160871 | 6/1994 |
| JP | 6-235925 A | 8/1994 |
| JP | 6-265915 | 9/1994 |
| JP | 06-76929 | 10/1994 |
| JP | 6-313870 A | 11/1994 |
| JP | 7-084268 A | 3/1995 |
| JP | 07-128626 | 5/1995 |
| JP | 7-128674 | 5/1995 |
| JP | 7-181507 | 7/1995 |
| JP | 8-95066 | 4/1996 |
| JP | 8-101395 A | 4/1996 |
| JP | 8-106101 | 4/1996 |
| JP | 8-171094 | 7/1996 |
| JP | 8-190099 | 7/1996 |
| JP | 08-234213 | 9/1996 |
| JP | 8-240807 | 9/1996 |
| JP | 08-304836 | 11/1996 |
| JP | 9-5762 | 1/1997 |
| JP | 9-26578 | 1/1997 |
| JP | 9-73075 | 3/1997 |
| JP | 9-73096 | 3/1997 |
| JP | 9-061829 A | 3/1997 |
| JP | 09-073096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 A | 6/1998 |
| JP | 10-221700 | 8/1998 |
| JP | 10-282512 | 10/1998 |
| JP | 10-333157 A | 12/1998 |
| JP | 10-333159 A | 12/1998 |
| JP | 11-14953 | 1/1999 |
| JP | 11-38424 | 2/1999 |
| JP | 11-038424 | 2/1999 |
| JP | 11-64811 | 3/1999 |
| JP | 11-109388 | 4/1999 |
| JP | 11-133438 A | 5/1999 |
| JP | 11-142864 A | 5/1999 |
| JP | 11-174477 | 7/1999 |
| JP | 11-212045 | 8/1999 |
| JP | 11-248930 A | 9/1999 |
| JP | 11-264991 | 9/1999 |
| JP | 11-326922 A | 11/1999 |
| JP | 11-344714 | 12/1999 |
| JP | 2000-29035 | 1/2000 |
| JP | 2000-002879 A | 1/2000 |
| JP | 2000-056311 A | 2/2000 |
| JP | 2000-066165 A | 3/2000 |
| JP | 2000-137235 A | 5/2000 |
| JP | 2000-147528 A | 5/2000 |
| JP | 2000-193988 A | 7/2000 |
| JP | 2000-241824 A | 9/2000 |
| JP | 2000-284295 A | 10/2000 |
| JP | 2000-292799 A | 10/2000 |
| JP | 2000-310759 A | 11/2000 |
| JP | 2000-310784 A | 11/2000 |
| JP | 2000-338501 A | 12/2000 |
| JP | 2001-005401 A | 1/2001 |
| JP | 2001-005405 A | 1/2001 |
| JP | 2001-013506 A | 1/2001 |
| JP | 2001-033793 A | 2/2001 |
| JP | 2001-042341 A | 2/2001 |
| JP | 2001-051284 A | 2/2001 |
| JP | 2001-066615 A | 3/2001 |
| JP | 2001-091727 A | 4/2001 |
| JP | 2001-117105 | 4/2001 |
| JP | 2001-117109 A | 4/2001 |
| JP | 2001-133745 A | 5/2001 |
| JP | 2001-133794 | 5/2001 |
| JP | 2001-133799 A | 5/2001 |
| JP | 2001-142074 | 5/2001 |
| JP | 2001-147437 | 5/2001 |
| JP | 2001-154211 | 6/2001 |
| JP | 2001-166272 A | 6/2001 |
| JP | 2001-166310 A | 6/2001 |
| JP | 2001-183683 A | 7/2001 |
| JP | 2001-201750 A | 7/2001 |
| JP | 2001-209052 A | 8/2001 |
| JP | 2001-209060 A | 8/2001 |
| JP | 2001-215459 A | 8/2001 |
| JP | 2001-222017 A | 8/2001 |
| JP | 2001-235758 A | 8/2001 |
| JP | 2001-255542 | 9/2001 |
| JP | 2001-264782 | 9/2001 |
| JP | 2001-272640 | 10/2001 |
| JP | 2001-281675 A | 10/2001 |
| JP | 2001-281678 A | 10/2001 |
| JP | 2001-282126 A | 10/2001 |
| JP | 2001-305563 A | 10/2001 |
| JP | 2001-330837 A | 11/2001 |
| JP | 2001-330840 | 11/2001 |

| | | |
|---|---|---|
| JP | 2001-356312 | 12/2001 |
| JP | 2001-356353 A | 12/2001 |
| JP | 2001-356354 | 12/2001 |
| JP | 2002-14360 | 1/2002 |
| JP | 2002-23176 | 1/2002 |
| JP | 2002-49045 | 2/2002 |
| JP | 2002-82340 | 3/2002 |
| JP | 2002-90759 | 3/2002 |
| JP | 2002-90760 | 4/2002 |
| JP | 2002-122872 | 4/2002 |
| JP | 2002-122873 | 4/2002 |
| JP | 2002-139734 | 5/2002 |
| JP | 2002-202512 | 7/2002 |
| JP | 2002-202514 | 7/2002 |
| JP | 2002-214626 | 7/2002 |
| KR | 1019990068245 | 8/1999 |
| KR | 2000-0035302 A | 6/2000 |

\* cited by examiner

METHOD OF FABRICATING LIQUID CRYSTAL DISPLAY DEVICE

This application claims the benefit of the Korean Application Nos. P2002-005828 filed on Feb. 1, 2002, and P2002-006488 filed on Feb. 5, 2002, which are hereby incorporated by reference.

BACKGROUND OF THE INVENTION

1. Field of the Invention

The present invention relates to a liquid crystal display device, and more particularly, to a method of fabricating a liquid crystal display device by using a liquid crystal dropping scheme.

2. Discussion of the Related Art

There are ultra-thin flat panel displays having a display screen of a few centimeters thick operated at a low voltage. Such displays consume less power and are portable. Among them, a liquid crystal display device has been most widely used in various fields such as a notebook computer, a monitor, a spacecraft, an airplane, and the like.

Such a liquid crystal display device generally includes a lower substrate having a plurality of thin film transistors and pixel electrodes formed thereon, an upper substrate having a black matrix layer, a color filter layer, and a common electrode formed thereon so as to face into the lower substrate, and a liquid crystal layer between the lower and upper substrates. An electric field is generated between the substrates by a voltage applied to the pixel and common electrodes so as to drive the liquid crystal layer. And, light transmittance is controlled through the driven liquid crystal layer so as to display images on the display screen.

In the above-described liquid crystal display device, the liquid crystal layer is formed between the lower and upper substrates by a vacuum injection method using a capillary phenomenon and a pressure difference. A method for fabricating a liquid crystal display device according to a related art using the vacuum injection method is explained as follows.

A plurality of thin film transistors and pixel electrodes are formed on a lower substrate. On an upper substrate, a black matrix layer, a color filter layer, and a common electrode are formed thereon.

A plurality of spacers are formed on one of the upper and lower substrates so as to maintain a uniform cell gap between the upper and lower substrates. A sealant is then formed on the circumference of one of the upper and lower substrates so as to prevent liquid crystals from leaking outside as well as bond the upper and lower substrates to each other. In this case, a thermo-hardening sealant such as an epoxy sealant is widely used for the sealant.

And, the upper and lower substrates are bonded to each other. The epoxy sealant, a mixture of epoxy resin and initiator, is heated for polymerization through cross-linkage so as to work as a sealant having an excellent adhesion.

The bonded substrates are loaded on a vacuum chamber to maintain a vacuum condition inside the bonded substrates, and then dipped into the liquid crystal. Once the vacuum condition is achieved inside the bonded substrates, the liquid crystal is sucked into the space between the bonded substrates by a capillary phenomenon.

When the bonded substrates are filled with a predetermined amount of the liquid crystal, a nitrogen gas ($N_2$) is slowly injected into the vacuum chamber so as to cause a pressure difference between the space of the bonded substrates and the ambience. Hence, the bonded substrates are completely filled with the liquid crystal so that a liquid crystal layer is formed between the upper and lower substrates.

Yet, such vacuum injection requires a long process time as a display screen becomes larger, thereby reducing productivity.

In order to overcome such a problem, a liquid crystal dropping method is newly proposed. A method of fabricating a liquid crystal display device using a liquid crystal dropping method according to a related art is explained as follows.

FIGS. 1A to 1D are perspective views illustrating a method of fabricating a liquid crystal display device using a liquid crystal dropping method according to a related art.

Referring to FIG. 1A, lower and upper substrates 1 and 3 are prepared for a liquid crystal dropping method. A plurality of gate and data lines are formed on the lower substrate 1 to cross with each other defining pixel areas. A thin film transistor is formed on each of the intersections between the gate and data lines. A pixel electrode is formed at each of the pixel areas so as to be connected to the thin film transistor.

A black matrix layer is formed on the upper substrate 3 to prevent light from leaking from the areas where the gate lines, the data lines, and the thin film transistors are formed. A color filter layer of red, green, and blue is formed on the upper substrate 3. A common electrode is formed on the upper substrate 3. An alignment layer is formed on at least one of the lower and upper substrates 1 and 3 for an initial alignment of the liquid crystal.

Referring to FIG. 1B, a sealant 7 is formed on the lower substrate 1. A plurality of liquid crystal droplets 5 are dispensed on the lower substrate 1 for forming a liquid crystal layer. And, spacers are scattered on the upper substrate 3 so as to maintain a uniform cell gap.

Referring to FIG. 1C, the lower and upper substrates 1 and 3 are attached to each other.

In the conventional vacuum injection method for fabricating an LCD, two substrates have to be attached to each other before the liquid crystal is injected therebetween. In the liquid crystal dropping method, the bonding process is carried out after the liquid crystal is dropped on the substrate. Hence, if a thermo-hardening sealant is used as the sealant 7, the sealant 7 flows out from the initial position during a heating process, thereby contaminating the liquid crystal 5. Therefore, an ultraviolet (UV)-hardening sealant is the choice of the sealant 7 in the liquid crystal dropping method.

Referring to FIG. 1D, UV rays from a UV emitting device 9 are irradiated on the entire surface of the attached substrates 1 and 3 including the sealant 7 to harden the sealant 7.

However, if the UV-rays are irradiated on an active area inside the sealant-formed area, device characteristics on the substrate such as thin film transistors and the like are degraded. Moreover, a pre-tilt angle of the alignment layer for the initial alignment of the liquid crystal is changed.

SUMMARY OF THE INVENTION

Accordingly, the present invention is directed to a method of fabricating a liquid crystal display device that substantially obviates one or more of problems due to limitations and disadvantages of the related art.

Another object of the present invention is to provide a method of fabricating a liquid crystal display device enabling to harden a sealant without causing any degradation on characteristics of an alignment layer, thin film transistors, and the like.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a liquid crystal display device according to the present invention includes forming a UV-hardening sealant on at least one of first and second substrates, dropping a liquid crystal on one of the first and second substrates, attaching the first and second substrates, aligning at least one mask with the attached substrates so as to expose only an area having the sealant formed thereon, and hardening the UV-hardening sealant by applying UV-rays though the mask to the attached substrates.

Aligning at least one mask includes forming a plurality of alignment marks on the mask and attached substrates for an alignment, and optimizing the alignment using an image device.

The mask is formed on one of first and second sides of the attached substrates. Also, the UV-rays are irradiated only within an area of the attached substrates.

The mask is formed on both first and second sides of the attached substrates.

The UV-rays are irradiated on both inside and outside areas of the attached substrates so that a portion of the irradiated UV-rays is reflected to the attached substrates.

The sealant includes one of monomer and oligomer, each having both ends coupled to an acrylic group.

The sealant includes one of monomer and oligomer, each having one end coupled to an acrylic group and the other end coupled to an epoxy group.

The method further includes heating the UV-hardening sealant after the hardening the UV-hardening sealant.

The method further includes forming a column spacer on the first substrate.

The UV-hardening sealant is formed on the first substrate and the liquid crystal is dropped on the second substrate.

In another aspect of the present invention, a method of fabricating a liquid crystal display device includes forming a UV-hardening sealant on at least one of the first and second substrates, dropping a liquid crystal on one of the first and second substrates, attaching the first and second substrates to each other, placing a mask on both first and second sides of the attached substrates so as to expose only an area having the sealant formed thereon, and irradiating UV-rays to the attached substrates covered with the masks.

If UV-rays are irradiated on the attached substrates having one side covered with a mask, portions of UV-rays reflected on the other side without a mask may cause the same problem of the related art. Therefore, the present invention forms masks on both sides of the attached substrates, thereby preventing the applied UV-rays from being irradiated on the areas other than the sealant-formed area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Figure 1A:
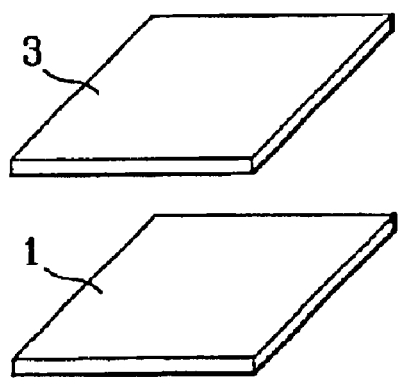
FIGS. 1A to 1D are perspective views illustrating a method of fabricating a liquid crystal display device using a liquid crystal dropping method according to a related art.
Figure 1B:
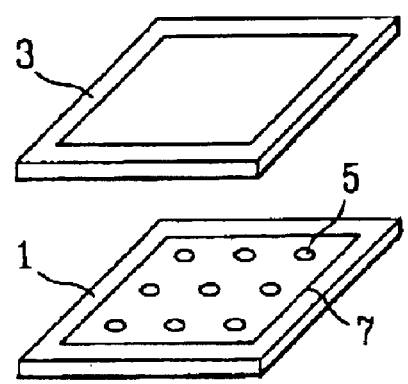
Figure 1C:
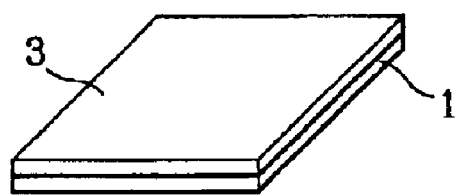
Figure 1D:
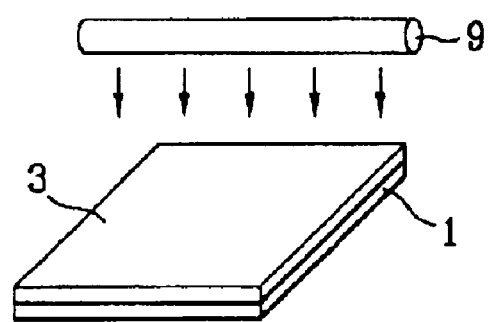

Reference will now be made in detail to the illustrated embodiments of the present invention, examples of which are illustrated in the accompanying drawings. Wherever possible, the same reference numbers will be used throughout the drawings to refer to the same or like parts.

FIGS. 2A to 2E are perspective views illustrating a method of fabricating a liquid crystal display device according to a first embodiment of the present invention. For simplicity, only one unit cell is shown in the drawings. Thus, a plurality of unit cells may be formed on a substrate in accordance with a size of the substrate.

Figure 2A:
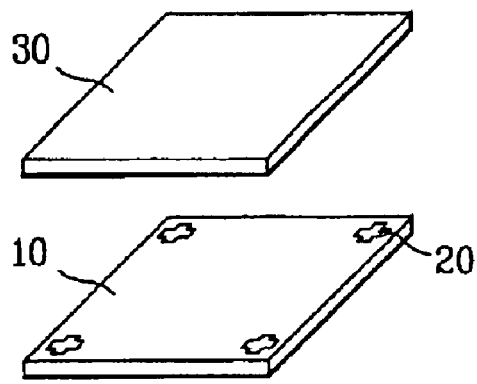
FIGS. 2A to 2E are perspective views illustrating a method of fabricating a liquid crystal display device according to a first embodiment of the present invention.

Referring to FIG. 2A, a lower substrate 10 having a first alignment mark 20 formed thereon and an upper substrate 30 are prepared for a further process. In the drawing, the first alignment mark 20 is formed on the lower substrate 10. Instead, the alignment mark 20 may be formed on the upper substrate 30.

More than one of the first alignment mark 20 may be formed in the diagonal direction on the substrate. Alternatively, at least one of the first alignment mark 20, as shown in the drawing, may be formed at each corner of the substrate.

Figure 5:
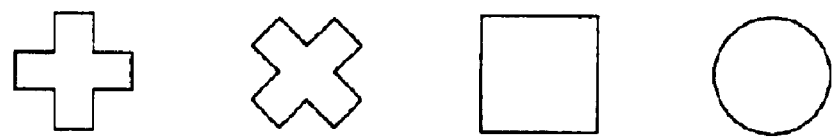
FIG. 5 illustrates shapes of various alignment marks according to the present invention.

In this case, the first alignment mark 20 may have one of various patterns, as shown in FIG. 5.

Although not shown in the drawing, a plurality of gate and data lines are formed on the lower substrate 10 so as to cross each other for defining pixel areas. A thin film transistor having a gate electrode, a gate insulating layer, a semiconductor layer, an ohmic contact layer, source/drain electrodes, and a passivation layer is formed on each of the intersections between the gate and data lines. And, a pixel electrode is formed in each of the pixel areas so as to be connected to the thin film transistor.

Moreover, an alignment layer for an initial alignment of the liquid crystal is formed on the pixel electrode. In this case, the alignment layer may be formed by a rubbing alignment treatment on a material such as polyamide, a polyimide-based compound, polyvinylalcohol (PVA), polyamic acid, or the like or a photo-alignment treatment on a photo-reactive material, such as a polyvinylcinnamate (PVCN)-based compound, a polysiloxanecinnamate (PSCN)-based compound, or a cellulosecinnamate (Cecl)-based compound.

A black matrix layer is formed on the upper substrate 30 so as to prevent light from leaking from the areas where the gate lines, the data lines, and the thin film transistors are formed. A color filter layer of red, green, and blue is formed on the upper substrate 30. A common electrode is formed on the upper substrate 30. An overcoat layer may be further formed between the color filter layer and the common electrode. Moreover, the above-explained alignment layer may be formed on the common electrode.

A plurality of silver (Ag) dots are formed on the lower substrate 10 so that a voltage is applied to the common electrode on the upper substrate 30 after bonding the substrates 10 and 30.

For an in-plane switching (IPS) mode liquid crystal display device, the common electrode is formed on the lower substrate having the pixel electrodes formed thereon so as to induce a horizontal electric field without forming the silver dots.

Figure 2B:
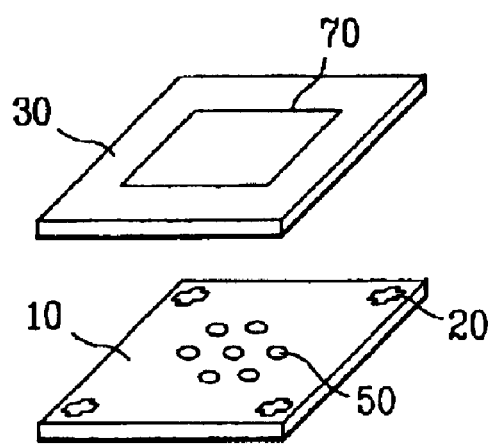

Referring to FIG. 2B, a UV-hardening sealant 70 is formed at the circumference of the upper substrate 30 so as to have a closed pattern without an injection inlet. The sealant 70 may be formed by one of a screen printing method and a dispensing method. A screen may directly contact a substrate in the screen printing method, thereby causing a damage on the alignment layer on the substrate. In addition, when the screen printing method is used to a large-sized substrate, there is a great loss in a sealant. Thus, it is economically feasible. Therefore, the dispensing method is more used.

The UV-hardening sealant 70 may be a mixture of monomer or oligomer having acrylic groups coupled to both ends with an initiator. An alternative choice may be another mixture of monomer or oligomer having acrylic and epoxy groups coupled to both ends, respectively with the initiator.

A plurality of liquid crystal droplets 50 are dispensed on the lower substrate 10 to form a liquid crystal layer. Coming into contact with the unhardened UV-hardening sealant 70, the liquid crystal droplets 50 may become contaminated. Hence, the liquid crystal droplets 50 are dispensed on the central portion of the lower substrate 10. The liquid crystal droplets 50 dispensed on the central portion spreads out slowly even after the UV-hardening sealant 70 is hardened, so that they are evenly distributed on the substrate and have the same density.

Instead, the liquid crystal droplets 50 and the UV-hardening sealant 70 may be also formed on the upper and lower substrates 30 and 10, respectively. The liquid crystal droplets 50 and the UV-hardening sealant 70 may be formed on the same substrate. However, in this case, an unbalance in the processes may occur between the substrate having the liquid crystal droplets 50 and the UV-hardening sealant 70 and the other substrate without the liquid crystal droplets 50 and the UV-hardening sealant 70, thereby consuming a longer process time. Moreover, when the liquid crystal droplets and the sealant are formed on the same substrate, it is unable to clean the substrate having the contaminated sealant before the bonding process. Therefore, the liquid crystal droplets and the sealant are formed on different substrates.

Moreover, after the UV-hardening sealant 70 has been formed on the upper substrate 30, an additional cleaning process may be carried out on the upper substrate 30 before the bonding process.

Although not shown in the drawing, spacers may be formed on one of the substrates 10 and 30 to maintain a uniform cell gap.

The spacers can be formed by mixing ball spacers in a solution with a proper concentration and spraying the mixed solution including the ball spacers on the substrate through a spraying nozzle at a high pressure, or by attaching column spacers to the substrate to correspond to the area having the gate or data lines formed thereon. However, when the ball spacers are applied to a large-sized substrate, a cell gap may become uneven. In this case, the column spacers or patterned spacers may be formed with photosensitive organic resin.

Figure 2C:
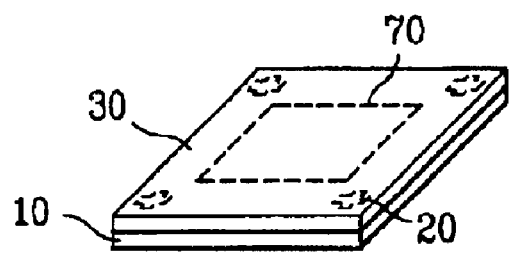

Referring to FIG. 2C, the lower and upper substrates 10 and 30 are attached to each other. The attaching process is carried out by placing the lower substrate having the liquid crystal dispensed thereon at the bottom, rotating 180° the second substrate to be placed over the upper substrate so that a layer-formed surface faces downward, and pressurizing the second substrate over the second substrate to attach the two substrates to each other or forming a vacuum condition in the space between the substrates, and releasing the vacuum condition to bond the substrates to each other.

Figure 2D:
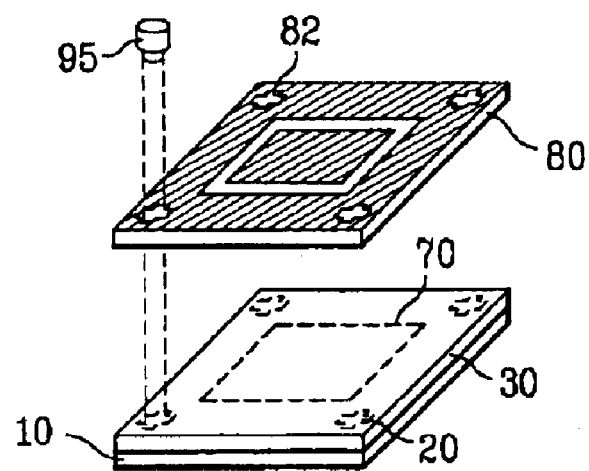

Referring to FIG. 2D, a mask 80 having a second alignment mark 82 formed thereon is placed over the attached substrates having the first alignment mark 20 formed thereon, and then aligned with the attached substrates by examining whether the first and second alignment marks 20 and 82 overlap each other through an image device 95.

The aligning process is carried out in a manner as follows. First, the mask (or the attached substrates) is moved along an x, y, or θ axis so as to overlap the first and second alignment marks 20 and 82 with each other, and then moved along a z axis so as to adjust an interval between the mask 80 and the attached substrates.

Meanwhile, the drawing shows that the mask 80 is placed over the attached substrates. Instead, the mask 80 may be placed under the attached substrates.

In this case, the second alignment mark 82 is formed to have the same pattern and the same number of patterns as the first alignment mark 20.

Figure 2E:
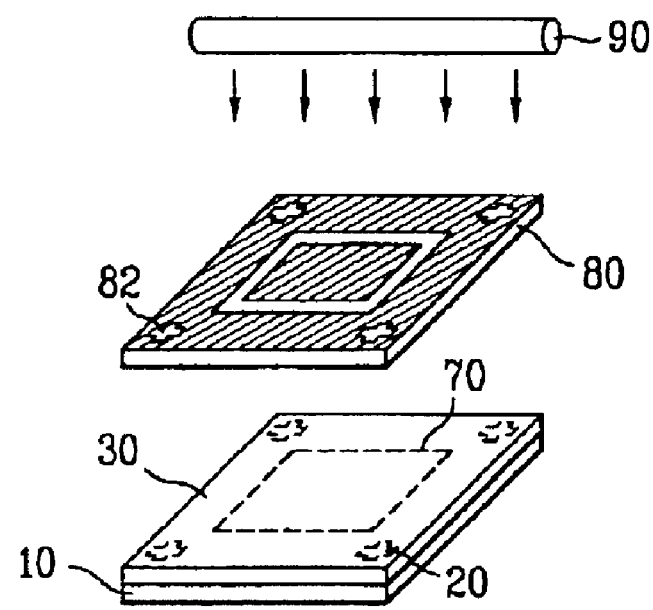

Referring to FIG. 2E, UV-rays are irradiated on the attached substrates covered with the mask 80 using a UV emitting device 90.

FIG. 2E shows that UV-rays are applied to the upper substrate 30 of the attached substrates. Instead, the attached substrates are turned upside-down so that UV-rays may be applied to the lower substrate 10.

Meanwhile, the sealant 70 may be hardened only by applying UV-rays to the lower or upper substrate of the attached substrates depending on the positions of the black matrix layer and the sealant 70 on the substrate. In other words, when the sealant 70 is formed on the periphery of the black matrix-formed area, UV-rays may be irradiated to the upper substrate having the black matrix layer formed thereon. On the other hand, when the sealant 70 is formed on the black matrix area, UV-rays have to be irradiated to the lower substrate only since the black matrix layer blocks the UV-rays irradiated to the upper substrate.

As mentioned above, the positions of the mask 80 and the UV emitting device 90 are adjusted to apply U-rays. Alternatively, the mask 80 and the UV emitting device 90 are fixed thereto and the UV-ray irradiated surface of the attached substrates may be changed.

Meanwhile, when UV-rays are irradiated to the mask formed on only either a top or bottom surface of the attached substrates, a portion of the UV-rays may be reflected on the uncovered surface of the substrate, so that the characteristics of the alignment layer, the thin film transistors, and the like may be degraded. Therefore, the UV-rays are irradiated within the surface of the attached substrates.

Once the UV-rays are irradiated, as explained above, monomer or oligomer activated by an initiator included in the UV-hardening sealant 70 initiates polymerization to form polymer so as to bond the lower and upper substrates 10 and 30 to each other.

In this case, when the UV-hardening sealant 70 is formed of monomer or oligomer, one end coupled to an acrylic group and the other end coupled to an epoxy group, mixed with an initiator, the epoxy group is not likely to respond to the UV-ray irradiation. Hence, an additional heating process is necessary after the UV-ray irradiation to completely harden the sealant. The heating process is performed at about 120° C. for an hour.

Although not shown in the drawing, a process of cutting the bonded substrates into a plurality of unit cells and a final inspection process are carried out after the UV-ray irradiation process.

The process of cutting the bonded substrates into a plurality of unit cells includes forming a scribing line on the surface of the bonded substrates using a pen or wheel of a diamond-based material having a hardness higher than glass (scribing process) and cutting the bonded substrates along the scribing line by applying an external force thereto (breaking process). Instead, the process of cutting the bonded substrates into a plurality of unit cells may be carried out by using a saw-tooth-like diamond pen or wheel for combining the scribing and breaking processes into one.

The final inspection process is to determine pass or failure before the substrate broken into the cell units is assembled into a liquid crystal module. More specifically, it is carried out to determine whether the respective pixels are driven correctly with or without applying a voltage.

FIGS. 3A to 3D are perspective views illustrating a method of fabricating a liquid crystal display device according to a second embodiment of the present invention. For simplicity, only one unit cell is shown in the drawing. A plurality of unit cells are formed on a substrate depending upon a size of the substrate.

Figure 3A:
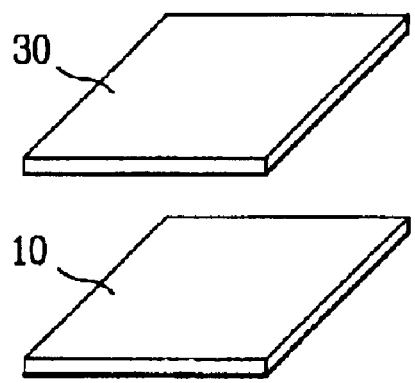
FIGS. 3A to 3D are perspective views illustrating a method of fabricating a liquid crystal display device according to a second embodiment of the present invention.

Referring to FIG. 3A, a lower substrate 10 and an upper substrate 30 are prepared for a further process.

Although not shown in the drawing, a plurality of gate and data lines are formed on the lower substrate 10 so as to cross with each other horizontally and vertically defining pixel areas. A thin film transistor including a gate electrode, a gate insulating layer, a semiconductor layer, an ohmic contact layer, source/drain electrodes, and a passivation layer is formed on each of the intersections between the gate and data lines. A pixel electrode is formed at each of the pixel areas so as to be connected to each thin film transistor.

An alignment layer for an initial alignment of a liquid crystal is formed on the pixel electrode. A black matrix layer is formed on the upper substrate 30 so as to prevent light from leaking from the areas where the gate lines, data lines, and thin film transistors are formed. A color filter layer of red, green, and blue is formed on the upper substrate 30. A common electrode is formed on the upper substrate 30. Besides, an overcoat layer is further formed between the color filter layer and the common electrode. Moreover, the alignment layer may be formed on the common electrode.

A plurality of silver (Ag) dots are formed on the circumference of the lower substrate 10. Meanwhile, in case of an in-plane switching (IPS) mode liquid crystal display device, the common electrode is formed on the lower substrate having the pixel electrodes formed thereon without forming the silver dots.

Figure 3B:
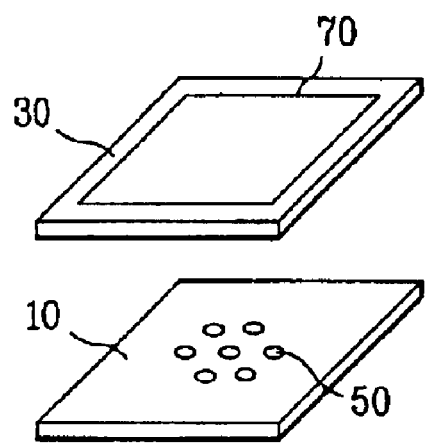

Referring to FIG. 3B, a plurality of liquid crystal droplets 50 are dispensed on the central portion of the lower substrate 10 so as to form a liquid crystal layer. And, a UV-hardening sealant 70 is formed at the circumference of the upper substrate by a screen printing method or a dispensing method so as to have a closed pattern without an injection inlet.

The UV-hardening sealant 70 may be a mixture of monomer or oligomer having acrylic groups coupled to both ends with an initiator. Alternatively, there may be another mixture of monomer or oligomer having acrylic and epoxy groups coupled to both ends, respectively with an initiator.

Instead, the liquid crystal droplets 50 and the UV-hardening sealant 70 may be also formed on the upper and lower substrates 30 and 10, respectively. Besides, both the liquid crystal droplets 50 and the UV-hardening sealant 70 may be formed on the same substrate.

After the UV-hardening sealant 70 is formed on the upper substrate 30, an additional cleaning process may be carried out on the upper substrate 30 before the bonding process.

Although not shown in the drawing, spacers may be formed on one of the substrates 10 and 30, so as to maintain a uniform cell gap.

Figure 3C:
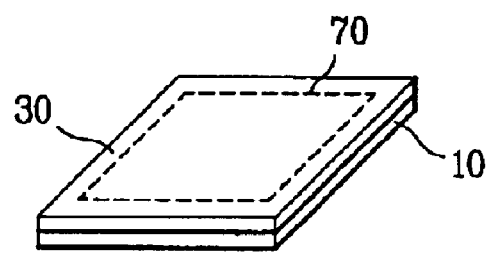

Referring to FIG. 3C, the lower and upper substrates 10 and 30 are attached to each other.

Figure 3D:
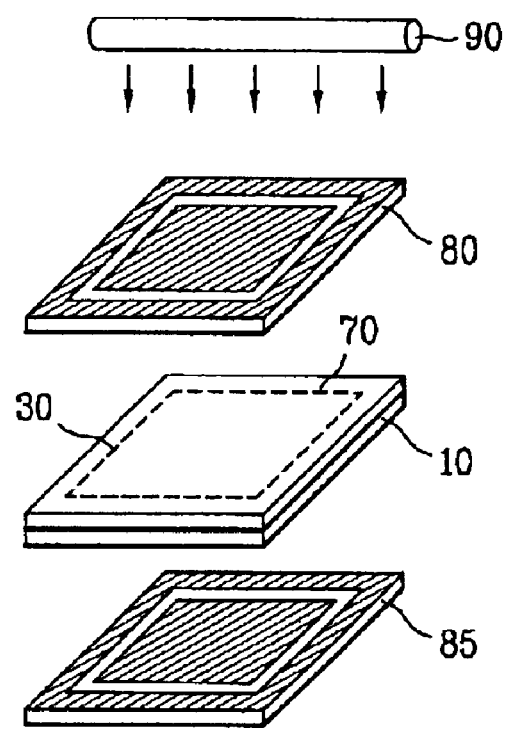

Referring to FIG. 3D, first and second masks 80 and 85 are positioned over and under the attached substrates so as to cover an area except for an area for forming the UV-hardening sealant 70. UV-rays are then irradiated thereto through a UV emitting device 90.

In this process, as shown in FIG. 3D, the UV emitting device 90 is placed over the attached substrates. Instead, the UV emitting device 90 may be placed under the attached substrates. Moreover, the UV-rays are irradiated to the upper substrate 30 of the attached substrates. Instead, the attached substrates are turned upside-down so that the UV-rays are irradiated to the lower substrate 10.

In the present invention, two masks at the top and bottom of the attached substrates may be used to apply UV-rays, thereby preventing the UV-rays from being reflected back to the area except for the sealant-formed area. Moreover, the UV-rays may be irradiated to other areas and the area of the attached substrates so as to reflect UV-rays back to the UV-hardening sealant 70, thereby increasing an efficiency to facilitate the hardening of the UV-hardening sealant 70.

When the UV-hardening sealant is formed of monomer or oligomer, one end coupled to an acrylic group and the other end coupled to an epoxy group, mixed with an initiator, the epoxy group is not likely to respond to the UV-ray irradiation. Hence, an additional heating process is necessary after the UV-ray irradiation so as to completely harden the sealant. The heating process is performed at about 120° C. for an hour.

Although not shown in the drawing, a process of cutting the bonded substrates into a plurality of unit cells and a final inspection process are carried out after the UV-ray irradiation process.

FIGS. 4A to 4E are perspective views illustrating a method of fabricating a liquid crystal display device according to a third embodiment of the present invention. The third embodiment is similar to the first embodiment of the present invention except for that two masks are formed at the top and bottom of the attached substrates to prevent UV-rays from being applied to an undesirable area.

Figure 4A:
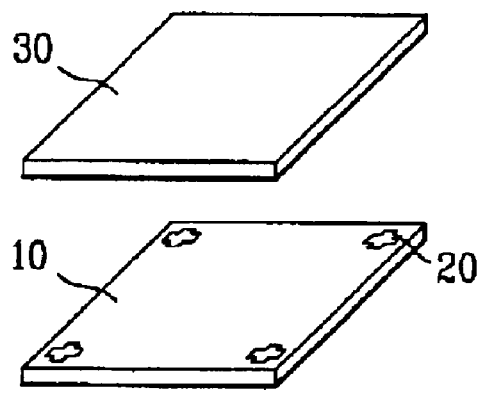
FIGS. 4A to 4E are perspective views illustrating a method of fabricating a liquid crystal display device according to a third embodiment of the present invention.

Referring to FIG. 4A, a lower substrate 10 having first alignment mark 20 formed thereon and an upper substrate 30 are prepared for a further process.

Figure 4B:
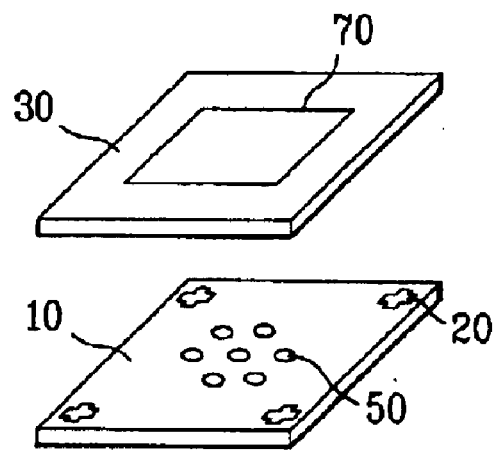

Referring to FIG. 4B, a plurality of liquid crystal droplets 50 are dispensed on the lower substrate 10 so as to form a liquid crystal layer. A UV-hardening sealant 70 is formed at the circumference of the upper substrate 30 by a screen printing method or a dispensing method so as to have a closed pattern without an injection inlet.

In addition, spacers may be formed on one of the substrates 10 and 30 so as to maintain a uniform cell gap.

Figure 4C:
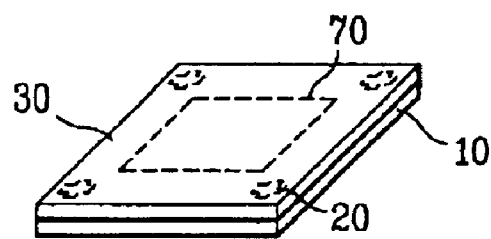

Referring to FIG. 4C, the lower and upper substrates 10 and 30 are attached to each other.

Figure 4D:
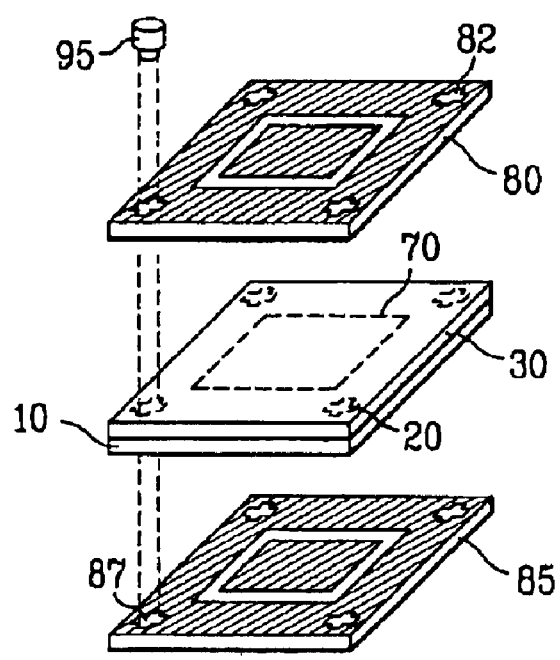

Referring to FIG. 4D, first and second masks 80 and 85 having second and third alignment marks 82 and 83 formed thereon, respectively, are positioned over and under the attached substrates, and then aligned with the attached substrates by using the first to third alignment marks 20, 82, and 87 with an image device 95.

Figure 4E:
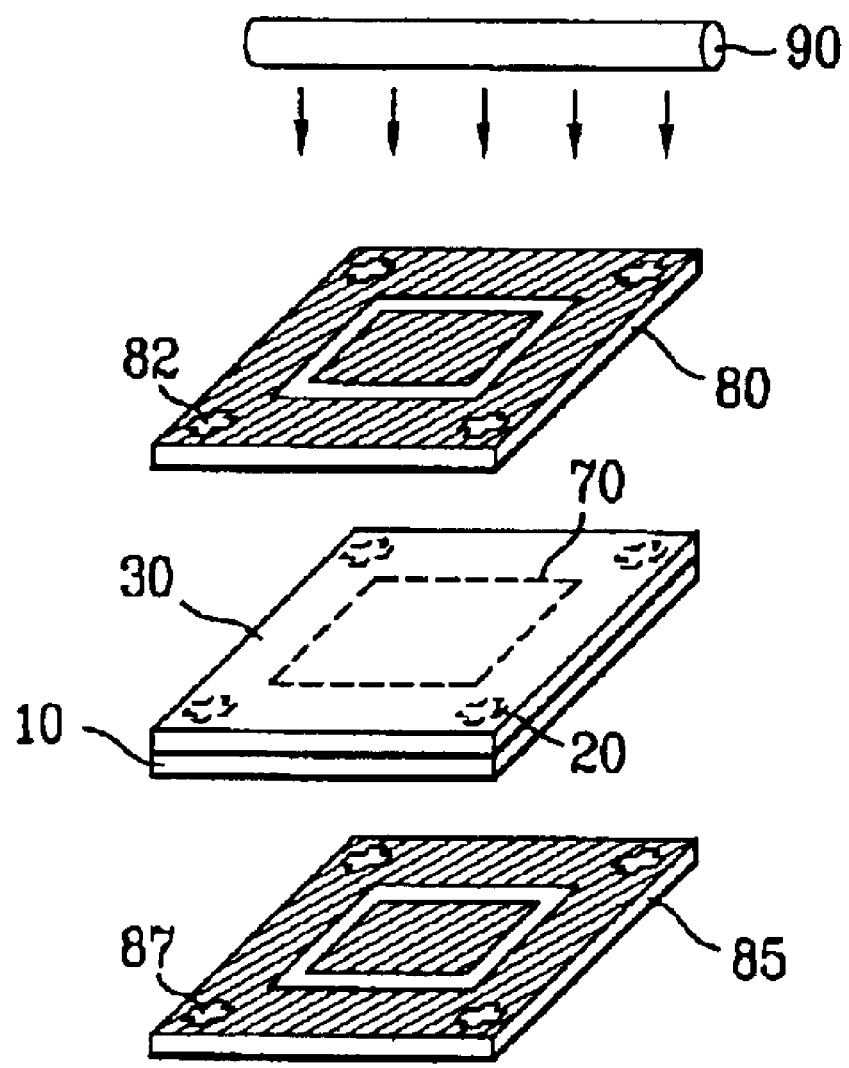

Referring to FIG. 4E, UV-rays are irradiated to the attached substrates covered with the first and second masks 80 and 85 through a UV emitting device 90.

In this case, the UV emitting device 90 may be placed over or under the attached substrates.

In the present invention, two masks at the top and bottom of the attached substrates may be used to apply UV-rays, thereby preventing UV-rays from degrading the characteristics of the alignment layer, the thin film transistors, and the like even if UV-rays are reflected on the opposite side from the UV emitting device 90.

Moreover, the UV-rays may be irradiated to other areas and the area of the attached substrates so as to reflect the UV-rays back to the UV-hardening sealant 70, thereby increasing an efficiency in facilitating the hardening of the UV-hardening sealant 70.

Although not shown in the drawing, a process of cutting the bonded substrates into unit cells and a final inspection process are carried out after the UV-ray irradiation process.

Figure 6:
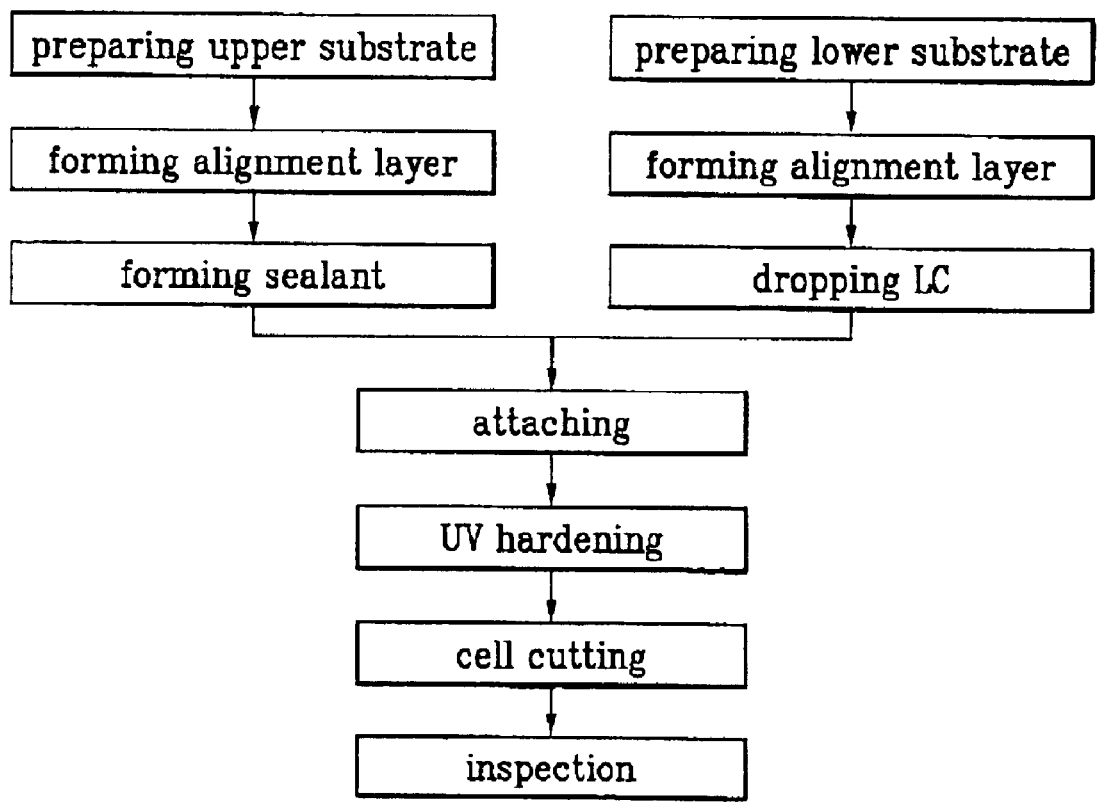
FIG. 6 illustrates a flowchart of a method of fabricating a liquid crystal display device according to the present invention.

FIG. 6 illustrates a flowchart of a method of fabricating a liquid crystal display device according to the present invention.

Referring to FIG. 6, an upper substrate is prepared, an alignment layer is formed on the upper substrate, and then a sealant is formed on the alignment layer so as to complete the upper substrate. On the other hand, a lower substrate is prepared, an alignment layer is formed on the lower substrate, and then a liquid crystal is dropped on the alignment layer so as to complete the lower substrate. The fabrication processes of the upper and lower substrates are carried out simultaneously. The liquid crystal and the sealant, as explained above, may be selectively formed on the substrates.

After completion of the upper and lower substrates, the upper and lower substrates are attached to each other, UV-rays are irradiated to harden the sealant, the bonded substrates are cut into a plurality of cell units. A final inspection process is then carried out to complete liquid crystal cells.

As explained above, the first embodiment of the present invention, the mask exposing only the sealant-formed area is precisely aligned with the attached substrates using the image device to minimize UV-ray irradiation on the area other than the sealant-formed area. Thus, degradations of the alignment layer, the thin film transistors, and the like are prevented.

In the second embodiment of the present invention, dual masks are used at both the top and bottom of the attached substrates, and then UV-rays are applied thereto. Hence, the UV-rays are irradiated on the UV-hardening sealant formed area only, thereby preventing the alignment layer on the substrates from being damaged or device characteristics of the thin film transistors and the like from being degraded. Moreover, in this embodiment, the UV-rays may be irradiated to other areas and the area of the attached substrates so as to reflect the UV-rays back to the UV-hardening sealant, thereby increasing an efficiency to facilitate the hardening of the UV-hardening sealant.

In the third embodiment of the present invention, dual masks are used at the top and bottom of the attached substrates, and then UV-rays are applied to the attached substrates and the other areas so as to reflect a portion of UV-rays back to the UV-hardening sealant area, thereby increasing an efficiency in facilitating the hardening of the UV-hardening sealant.

It will be apparent to those skilled in the art that various modifications and variations can be made in the method of fabricating a liquid crystal display of the present invention without departing from the spirit or scope of the inventions. Thus, it is intended that the present invention covers the modifications and variations of this invention provided they come within the scope of the appended claims and their equivalents.

What is claimed is:

1. A method of fabricating a liquid crystal display device, comprising:
    forming a UV-hardening sealant on a first substrate;
    dropping a liquid crystal on a second substrate;
    attaching the first and second substrates;
    aligning at least one mask with the attached substrates so as to expose only an area having the sealant formed thereon; and
    hardening the UV-hardening sealant by applying UV-rays through the mask to the attached substrates,
        wherein the sealant includes one of monomer and oligomer, each having both ends coupled to an acrylic group.

2. The method of claim 1, wherein the aligning at least one mask includes forming a plurality of alignment marks on the mask and attached substrates for an alignment, and optimizing the alignment using an image device.

3. The method of claim 1, wherein the mask is formed on one of the first and second sides of the attached substrates.

4. The method of claim 3, wherein the UV-rays are irradiated only within an area of the attached substrates.

5. The method of claim 1, wherein the mask is formed on both first and second sides of the attached substrates.

6. The method of claim 5, wherein the UV-rays are irradiated on both inside and outside areas of the attached substrates so that a portion of the irradiated UV-rays is reflected to the attached substrates.

7. The method of claim 1, further comprising heating the UV-hardening sealant after hardening the UV-hardening sealant.

8. The method of claim 1, further comprising forming a column spacer on the first substrate.

9. The method of claim 1, further comprising aligning the mask with the attached substrates by using an image device.

10. A method of fabricating a liquid crystal display device, comprising:

forming a UV-hardening sealant on a first substrate;

dropping a liquid crystal in a second substrate;

attaching the first and second substrates;

aligning at least one mask with the attached substrate so as to expose only an area having the sealant formed thereon; and hardening the UV-hardening sealant by applying UV-rays through the mask to the attached substrates, wherein the sealant includes one of monomer and oligomer, each having one end coupled to an acrylic group and the other end coupled to an epoxy group.

11. The method of claim 10, wherein the aligning at least one mask includes forming a plurality of alignment marks on the mask and attached substrates for an alignment, and optimizing the alignment using an image device.

12. The method of claim 10, wherein the mask is formed on one of the first and second sides of the attached substrates.

13. The method of claim 12, wherein the UV-rays are irradiated only within an area of the attached substrates.

14. The method of claim 10, wherein the mask is formed on both first and second sides of the attached substrates.

15. The method of claim 14, wherein the UV-rays are irradiated on both inside and outside areas of the attached substrates so that a portion of the irradiated UV-rays is reflected to the attached substrates.

16. The method of claim 10, further comprising heating the UV-hardening sealant after hardening the UV-hardening sealant.

17. The method of claim 10, further comprising forming a column spacer on the first substrate.

18. The method of claim 10, further comprising aligning the mask with the attached substrates by using an image device.

19. A method of fabricating a liquid crystal display device, comprising:

forming a UV-hardening sealant on a first substrate;

dropping a liquid crystal on a second substrate;

attaching the first and second substrates to each other;

placing a mask on both first and second sides of the attached substrates so as to expose only an area having the sealant formed thereon; and irradiating UV-rays to the attached substrates covered with the masks.

20. The method of claim 19, wherein the sealant includes one of monomer and oligomer, each having both ends coupled to an acrylic groups.

21. The method of claim 19, wherein the sealant includes one of monomer and oligomer, each having one end coupled to an acrylic group and the other end coupled to an epoxy group.

22. The method of claim 19, further comprising heating the UV-hardening sealant after irradiating the UV-rays.

23. The method of claim 19, wherein the UV-rays are irradiated on both inside and outside areas of the attached substrates so that a portion of the irradiated UV-rays is reflected to the attached substrates.

24. The method of claim 19, further comprising forming a column spacer on the first substrate.

* * * * *